United States Patent
Rao et al.

(10) Patent No.: US 9,577,988 B2
(45) Date of Patent: Feb. 21, 2017

(54) DATA ENCRYPTION, TRANSPORT, AND STORAGE SERVICE FOR CARRIER-GRADE NETWORKS

(71) Applicant: Verizon Patent and Licensing Inc., Arlington, VA (US)

(72) Inventors: Ravindra J. Rao, Sunnyvale, CA (US); Gary R. Francis, San Clemente, CA (US); Ashay Chaudhary, Redmond, WA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 85 days.

(21) Appl. No.: 14/497,440

(22) Filed: Sep. 26, 2014

(65) Prior Publication Data

US 2016/0094521 A1 Mar. 31, 2016

(51) Int. Cl.
*H04L 29/06* (2006.01)

(52) U.S. Cl.
CPC ......... *H04L 63/0428* (2013.01); *H04L 63/061* (2013.01)

(58) Field of Classification Search
CPC .............................. H04L 63/0428; H04L 63/061
See application file for complete search history.

(56) References Cited

U.S. PATENT DOCUMENTS

| | | | |
|---|---|---|---|
| 7,519,184 B2* | 4/2009 | Kayashima | H04L 9/0891 380/201 |
| 9,204,345 B1* | 12/2015 | Roskind | H04L 63/101 |
| 2002/0065919 A1* | 5/2002 | Taylor | G06F 17/30575 709/226 |
| 2004/0139314 A1* | 7/2004 | Cook | G06Q 10/107 713/151 |
| 2010/0318468 A1* | 12/2010 | Carr | G06Q 20/027 705/79 |
| 2012/0303740 A1* | 11/2012 | Ferris | G06F 17/30194 709/217 |
| 2013/0042106 A1* | 2/2013 | Persaud | G06F 21/606 713/165 |
| 2014/0025948 A1* | 1/2014 | Bestler | H04L 9/0863 713/167 |
| 2015/0052036 A1* | 2/2015 | Vernal | G06Q 40/00 705/35 |
| 2015/0227757 A1* | 8/2015 | Bestler | G06F 21/6227 713/167 |

* cited by examiner

*Primary Examiner* — Mohammad A Siddiqi

(57) ABSTRACT

A method, a system, and a non-transitory storage medium for storing user preferences pertaining to a data encryption service that provides on-demand encryption for data in-flight and at rest; receiving data from a user device; determining whether to invoke the data encryption service based on the data and the user preferences; generating a key to encrypt the data based on determining that the data encryption service is to be invoked; generating a first message that includes the data, the key, and data indicating where encrypted data is to be stored; establishing a secure connection with a device; and transmitting the first message to the device via the secure connection.

20 Claims, 9 Drawing Sheets

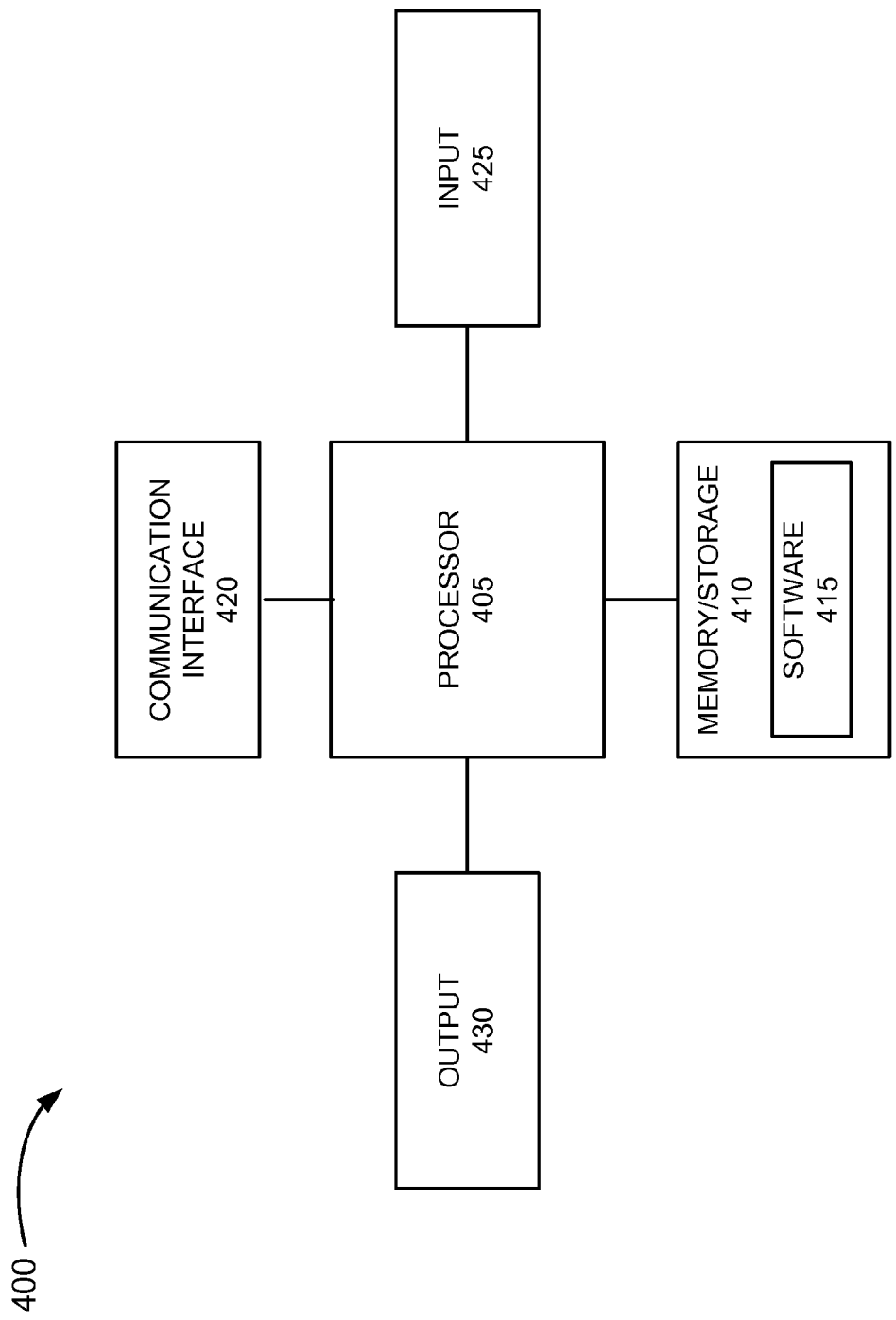

DATA ENCRYPTION, TRANSPORT, AND STORAGE SERVICE FOR CARRIER-GRADE NETWORKS

BACKGROUND

Ubiquitous communication and information exchange offers users enumerable advantages. However, under current paradigms, security always remains an issue. For example, in the past several years, hackers have breached data storage facilities and obtained sensitive data.

BRIEF DESCRIPTION OF THE DRAWINGS

FIG. 4 is a diagram illustrating exemplary components of a device that may correspond to one or more devices in the exemplary environment.

DETAILED DESCRIPTION OF PREFERRED EMBODIMENTS

Figure 1:
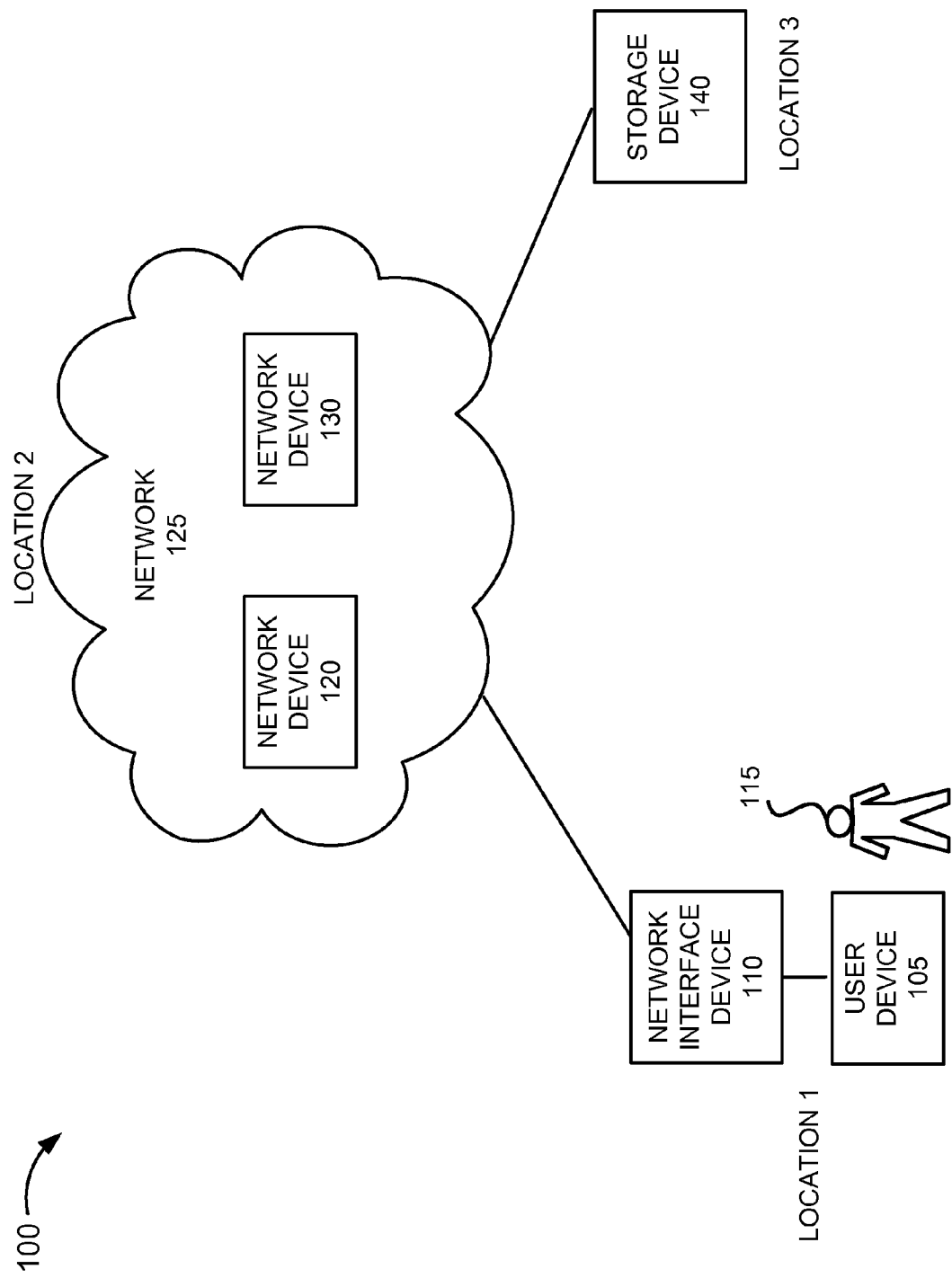
FIG. 1 is a diagram illustrating an exemplary environment in which an exemplary embodiment of a data encryption service may be implemented.

The following detailed description refers to the accompanying drawings. The same reference numbers in different drawings may identify the same or similar elements. Also, the following detailed description does not limit the invention.

According to exemplary embodiments, a carrier-grade data encryption, transport, and storage service (referred to hereinafter as "data encryption service") is provided. According to an exemplary embodiment, the data encryption service provides a complete end-to-end service to customers using a carrier-grade network to encrypt, transport and store data external to the user's location. For example, an encryption key management service may be provided at one location (e.g., at a user's location), an encryption service that encrypts data may be provided at another location (e.g., in a cloud, the Internet, a third party location), and an encrypted data storage service may store the encrypted data at yet another location (e.g., in another cloud, the Internet, a third party location). According to other examples, the encryption key management service, the encryption service, and/or the encrypted data storage service may be performed at a same location.

According to an exemplary embodiment, users subscribe to the data encryption service and subsequently invoke the data encryption service on-demand. For example, users may access a portal to subscribe to the data encryption service. During an on-boarding process, the portal may instantiate various encryption components to provide the data encryption service. According to an exemplary embodiment, the encryption components include a policy engine, an encryption key management system, a secure transport function, and an encryption engine. The policy engine provides, among other things, policies that govern what data is subject to the data encryption service. The encryption key management system provides keys to be used for encrypting data. According to an exemplary embodiment, the data encryption service allows users to order, manage, and use encryption keys (e.g., public and private). The encryption service uses the encryptions keys, which are under the control of the users, to encrypt data. The secure transport function provides secure transport services for any data transported from the users' location. For example, the secure transport function may be implemented as an Internet Protocol Security Virtual Private Network (IPsec VPN) tunnel. The encryption engine encrypts data based on encryption keys. For example, the encryption engine may encrypt according to various industry standards (e.g., Health Insurance Portability and Accountability Act (HIPPA), Payment Card Industry (PCI), etc.) and use various encryption technologies (e.g., Advanced Encryption Standard (AES) (AES-128, AES-256, etc.), Rivest, Shamir, and Adleman (RSA), (RSA-1024, etc.), etc.). Subsequent to encryption of the data, the encrypted data is stored at a location specified by the user.

While exemplary embodiments explained in this description may be implemented based on the use of a particular protocol, language, platform, etc., such implementations are not intended to be restrictive or provide an exhaustive treatment, as such. In other words, the embodiments described herein may be implemented using other suitable protocols, languages, platforms, etc., which may not be specifically described. Additionally, a device, a function, and/or an element may be implemented in physical and/or virtual forms.

FIG. 1 is a diagram illustrating an exemplary environment 100 in which an exemplary embodiment of a data encryption service may be implemented. As illustrated, environment 100 includes a user device 105, a network interface device 110, a network 125 that includes a network device 120 and a network device 130, and a storage device 140. As further illustrated, environment 100 includes a user 115 and locations 1, 2, and 3.

Environment 100 may be implemented to include wired, optical, and/or wireless connections among the devices and the network illustrated. A connection may be direct or indirect and may involve an intermediary device and/or an intermediary network not illustrated in FIG. 1. Additionally, the number, type (e.g., wired and wireless), and the arrangement of connections between the devices and the networks are exemplary.

A device may be implemented according to a centralized computing architecture, a distributed computing architecture, or a cloud computing architecture (e.g., an elastic cloud, a private cloud, a public cloud, etc.). Additionally, a device may be implemented according to one or multiple network architectures (e.g., a client device, a server device, a peer device, a proxy device, and/or a cloud device).

The number of devices, the number of networks, and the configuration in environment 100 are exemplary. According to other embodiments, environment 100 may include additional devices, fewer devices, and/or differently arranged devices, than those illustrated in FIG. 1. For example, a single device in FIG. 1 may be implemented as multiple devices and/or multiple devices may be implemented as a single device. By way of further example, network device 120 may be implemented as multiple devices, such as a computer and an external storage device, and/or network device 130 and storage device 140 may be combined into a single device. Additionally, according to an exemplary embodiment, a network, a link (e.g., a connection), and/or network device may be carrier-grade (e.g., carrier class) versus consumer grade or other lower grade.

Additionally, or alternatively, environment 100 may include additional networks and/or differently arranged networks, than those illustrated in FIG. 1. For example, environment 100 may include an intermediary network. The types of devices and the types of networks described in environment 100 are also exemplary. Also, according to other embodiments, one or more functions and/or processes described as being performed by a particular device may be performed by a different device, or some combination of devices.

Referring to FIG. 1, user device 105 is an end user device that is operated by user 115. User device 105 may be a mobile device or a stationary device that has communicative capabilities. For example, user device 105 may be implemented as a computer (e.g., a desktop computer, a laptop computer, a palmtop computer, etc.), a mobile device (e.g., a smartphone, a tablet, a netbook, etc.), or some other type of end user device (e.g., an Internet/web access device, etc.).

According to an exemplary embodiment, network interface device 110 includes a device that provides access to and from a network and network devices. For example, network interface device 110 may be implemented as a router (e.g., a broadband router, a wireless router), a base station (e.g., a home enhanced node B (HeNB)), a wireless access point (e.g., a femto access point (FAP), a picostation), a gateway device, a computer server, or other suitable node or device. Network interface device 110 may be customer premise equipment with respect to the service provider of the data encryption service. According to an exemplary implementation, user device 105 and network interface device 110 create a local area network (LAN).

According to an exemplary embodiment, network interface device 110 includes a policy engine, a secure transport function, and an encryption key management system that support the data encryption service. The policy engine, the secure transport function, and the encryption key management system are described further below.

Network device 120 provides a portal service that allows user 115 to subscribe to the data encryption service. During an on-boarding process, network device 120 instantiates components of the data encryption service. According to an exemplary embodiment, the components include the policy engine, the secure transport function, the encryption key management system, and an encryption engine. According to an exemplary implementation, network device 120 instantiates the components by pushing an executable file that may perform an auto-install on a device (e.g., network interface device 110). For example, network device 120 may transmit an executable file that auto-installs the encryption key management system on network interface device 110. According to another exemplary implementation, network interface device 110 may already have encryption key management software (e.g., pre-installed), but network interface device 110 activates this component when user 115 subscribes to the data encryption service. According to an exemplary embodiment, although not illustrated, network device 120 instantiates the policy engine, the secure transport function and the encryption key management system on network interface device 110, although in other embodiments, these elements may be instantiated on user device 105, such as a home computer or mobile device. Additionally, although not illustrated, network device 120 instantiates the encryption engine on network device 130. According to other embodiments, these components may be instantiated on different devices and/or locations than described above.

Subsequent to user 115 subscribing to the data encryption service, network device 120 allows user 115 to configure the data encryption service. For example, user 115 may specify policies, which are used by the policy engine, that govern, among other things, which data are subject to the data encryption service, the type of encryption (e.g., AES, RSA, etc.) to be used to encrypt data, key length (e.g., 1024 bits, 256 bits, etc.), and a location (e.g., network address, path information (e.g., drive, folder, etc.)) of where encrypted data is to be stored on storage device 140. The data encryption service may also include a notification service, which can be configured. For example, user 115 may request that a message (e.g., e-mail, text message, etc.) be transmitted to user 115 confirming that data has been encrypted and stored at a particular location. User 115 may also be able to turn on and turn off the data encryption service on-demand via network device 120.

According to an exemplary embodiment, network device 120 is implemented as an on-line portal (e.g., a web portal, a private portal, etc.). For example, user 115 may log into network device 120 via network 125 (e.g., the Internet). Network device 120 authenticates and authorizes user 115 to access the portal service. Upon successfully logging in, user 115 is provided various user interfaces pertaining to the data encryption service, such as account management, configuration of the data encryption service, and data encryption usage history. Network device 120 may also manage updates to components of the data encryption service, such as the policy engine, the encryption key management system, the secure transport function, and the encryption engine.

Network 125 includes a network that provides access to network device 130. For example, network 125 may be implemented as a wireless network, a wired network, an optical network, a private network, a public network, an IP network, the Internet, a cloud network, a wide area network (WAN), a metropolitan area network (MAN), and/or other suitable network. According to this example, network device 120 and network device 130 are included in network 125. According to other implementations, network device 120 and network device 130 may reside in different networks.

Network device 130 provides an encryption service. Network device 130 may also provide other services, such as authentication and/or authorization services in relation to user device 105. According to an exemplary embodiment, network device 130 encrypts data using a key-based encryption algorithm (e.g., RSA, AES, etc.). Network device 130 may encrypt data using various key lengths. Network device 130 may also comply with various industry standards (e.g., HIPPA, PCI, etc.). Network device 130 may be implemented as an elastic encryption engine. For example, the elastic encryption engine may monitor the encryption workload and automatically adjust the computational capabilities of the encryption engine.

Depending on the data to be encrypted and security level desired, network device 130 may encrypt data according to various encryption technologies. The description of exemplary encryption algorithms is not intended to be exhaustive, and network device 130, and more generally, the data encryption service, may use encryption techniques including future or next-generation encryption technologies, keyless encryption technologies, or single-key encryption technologies to implement the data encryption service described herein. However, in the event that an encryption technology is key-based, according to an exemplary embodiment, the data encryption service provides that keys are managed and under the control of the users of the data encryption service and not the data encryption service provider. Network device 130 may be implemented as a computer that includes one or multiple encryption engines.

Storage device 140 includes a device that can store encrypted data. For example, storage device 140 may be implemented as a cloud storage device, a dropbox, a hard drive on a user device, file server, etc., a USB memory stick, a mass storage system, or some other form of a storage device. Storage device 140 may also provide a notification service. For example, storage device 140 may transmit a message (e.g., e-mail, text message, etc.) to user 115 and/or another party confirming that data has been encrypted and stored by storage device 140. As an example, user 115's workplace may require a message so as to satisfy a compliance or logging requirement. Storage device 140 may be implemented as virtual storage or discrete (e.g., dedicated) storage.

Figure 2A:
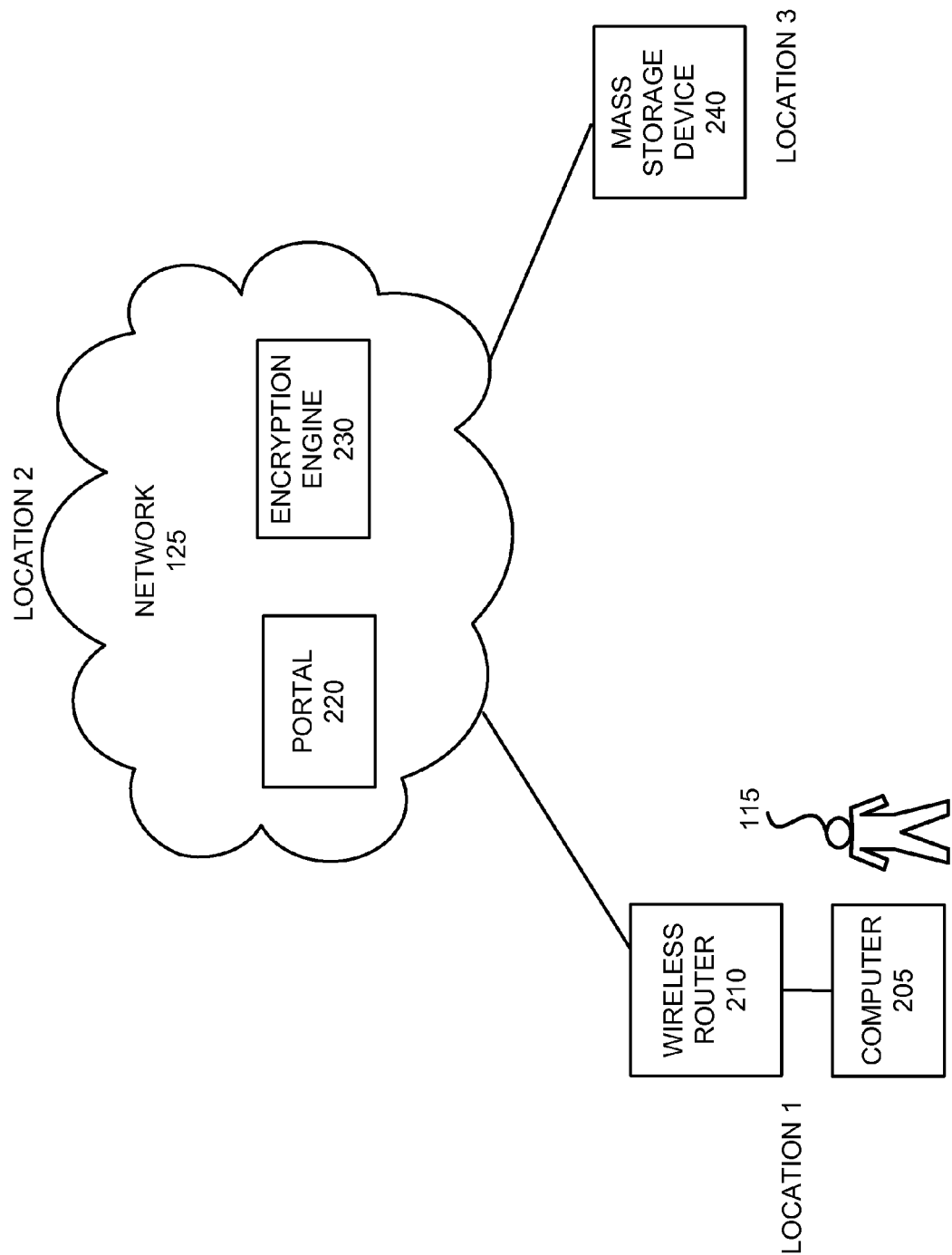
FIGS. 2A and 2B are diagrams that illustrate exemplary implementations and functional components pertaining to the data encryption service.

FIG. 2A is a diagram illustrating an exemplary implementation of the data encryption service in which user device 105 is implemented as a computer 205, network interface device 110 is implemented as a wireless router 210, network device 120 is implemented as a portal 220, network device 130 is implemented as an encryption engine 230, and storage device 140 is implemented as a mass storage device 240. As previously described, according to an exemplary embodiment, network interface device 110 includes the policy engine, the encryption key management system, and the secure transport function. These components are described further below.

Figure 2B:
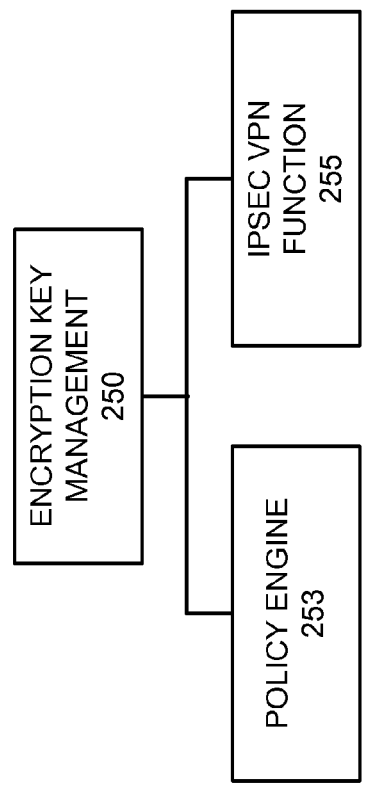

FIG. 2B is a diagram illustrating an encryption key management 250, a policy engine 253, and an IPsec VPN function 255, which are included in wireless router 210. Encryption key management 250 includes logic that generates keys for encryption and decryption of data. For example, encryption key management 250 may generate private and public keys based on a public key infrastructure (PKI). Encryption key management 250 transmits public keys to encryption engine 230 via IPsec VPN function 255, which in turn are used to encrypt data.

Policy engine 253 includes logic that manages which data is subject to the data encryption service. For example, user 115 may indicate which data is to be encrypted via a user interface. For example, user 115 may indicate that all traffic destined from computer 205 to a website (e.g., dropboxservice.com) or a particular IP address is to be encrypted. Alternatively, user 115 may specify criteria to invoke the data encryption service, such as data of a particular application (e.g., Microsoft Word, Microsoft Office Excel, Microsoft PowerPoint, file extension, etc.) or other attribute of the data (e.g., indicated in metadata, such as name of a file, author of a file, etc.), and/or data received during a particular time window (e.g., date, day, and/or time). Alternatively, user 115 may share his or her calendar information with policy engine 253. For example, user 115 may transmit calendar information to a particular e-mail address of policy engine 253, which in turn, is obtained by policy engine 253.

Policy engine 253 may store and use the calendar information of user 115 to associate a transmission of data (e.g., based on time proximity to an event included in the calendar information) with an event (e.g., a meeting). Based on the association, policy engine 253 may determine that data is to be encrypted. Alternatively, for example, user device 105 may operate in different modes (e.g., a work mode, a personal mode, a profile mode (e.g., a hobby mode, a friends mode, etc.), etc.). Policy engine 253 may obtain the mode of user device 105 and determine whether data is to be encrypted based on a policy configured for a particular mode. Based on one or multiple policies set by user 115, policy engine 253 can automatically determine which data is to be encrypted based on the policies set by user 115. Additionally, user 115 may manually invoke, via a user interface, data to be encrypted by the data encryption service.

Policy engine 253 allows user 115 to select various preferences pertaining to the data encryption service, such as the encryption technology to be used and where the encrypted data is to be stored (e.g., at location 3). Policy engine 253 may allow user 115 to designate that encrypted data is stored at a single location or multiple locations. Policy engine 253 may store the policies (e.g., preferences) in a database or suitable data structure.

IPsec VPN function 255 includes logic that provides a secure connection between wireless router 210 and encryption engine 230. For example, IPsec VPN function 255 ensures that the data transmitted between location 1 and location 2 is secure and encrypted based on the IPsec protocol suite. According to an exemplary implementation, during instantiation, IPsec VPN function 255 is configured with a customer-generated electronic certificate. The electronic certificate is encrypted using a private key. In this way, the data encryption service provider will have no access to data at location 1.

In view of the foregoing components, the data encryption service provides for encrypting data both in-flight (e.g., during transmission) and at rest (e.g., during storage) onto an existing physical/virtual network in a carrier-grade network service provider environment.

Figure 3A:
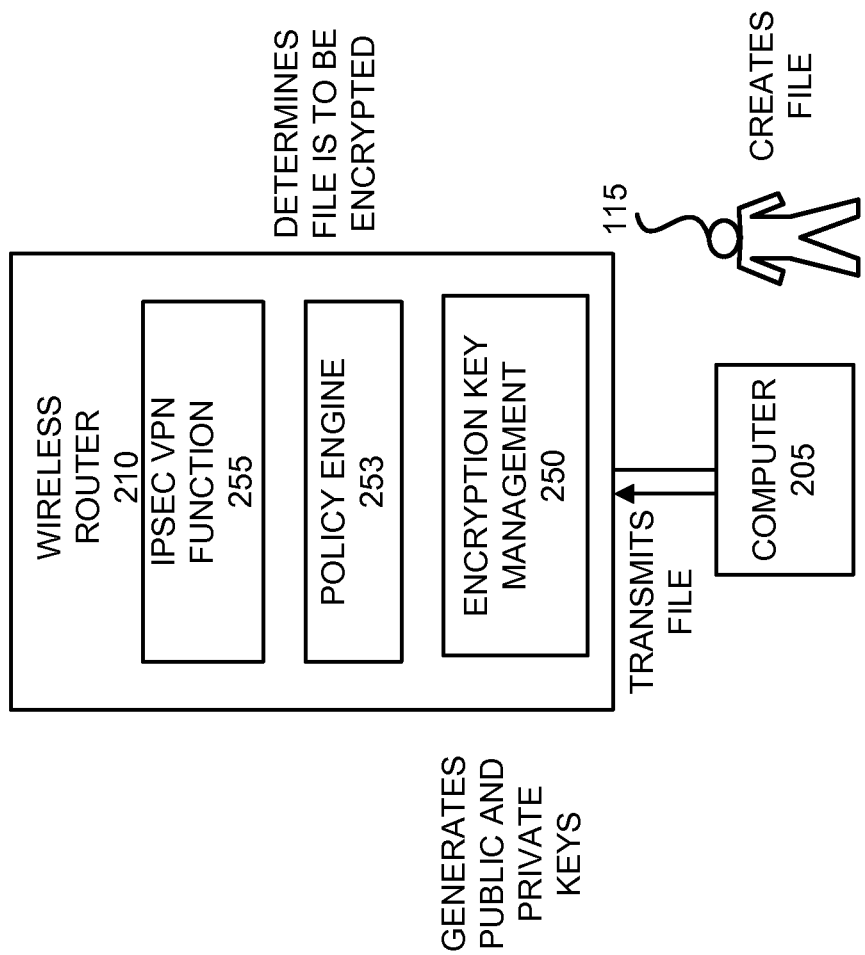
FIGS. 3A-3C are diagrams illustrating exemplary scenarios pertaining to an exemplary embodiment of the data encryption service.
Figure 3B:
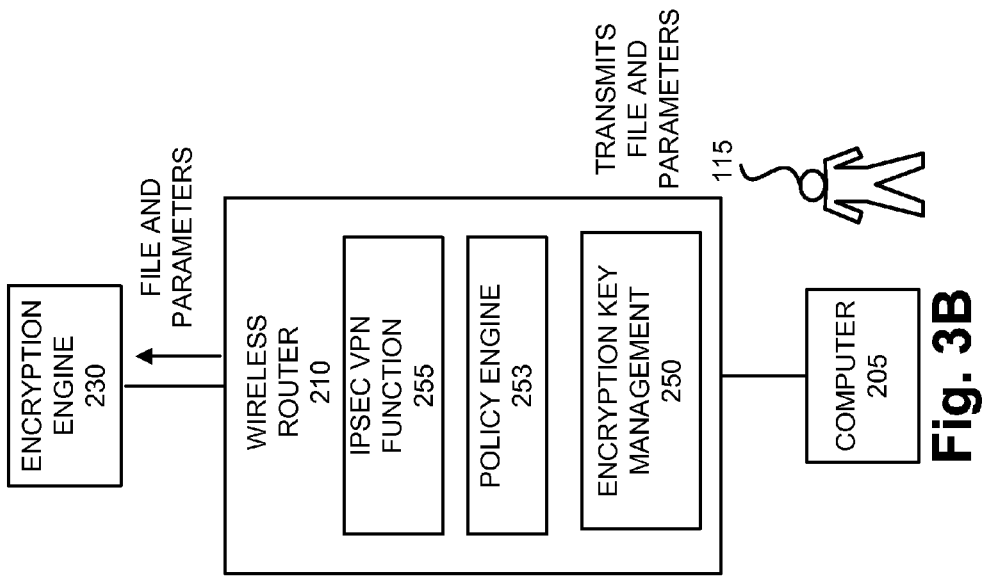
Figure 3C:
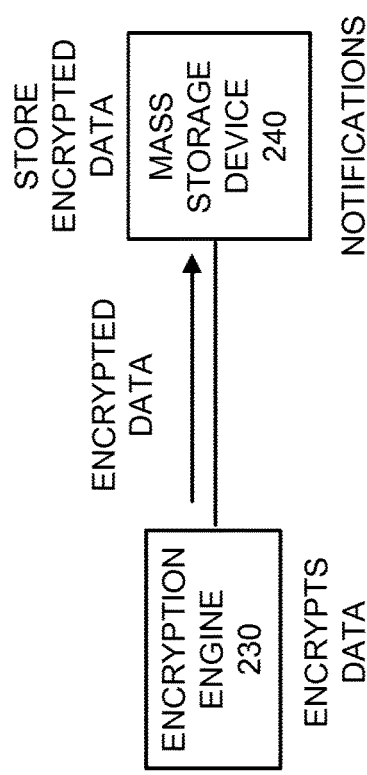

FIGS. 3A-3C are diagrams illustrating exemplary scenarios pertaining to an exemplary embodiment of the data encryption service. Referring to FIG. 3A, wireless router 210 has been configured with encryption key management 250, policy engine 253, and IPsec VPN function 255. User 115 has specified certain user preferences (e.g., policies), such as, for example, encryption technology to be used, criteria which can be used to determine when the data encryption service is to be invoked, where the encrypted data is to be stored, and parameters pertaining to the notification service.

According to this scenario, assume user 115 works on a project and creates a file on computer 205 that user 115 wishes to share with other people. At the end of the day, after the file is completed, user 115 transmits the file to a particular network address via computer 205 and wireless router 210. For example, the network address may be directed to mass storage device 240 at location 3 (not shown in FIG. 3A).

Upon receiving the file, policy engine 253 determines that the file is to be encrypted based on the network address of mass storage device 240 and the file type (e.g., application file extension) of the file. As an example, policy engine 253 may perform (deep) packet inspection to identify the file type. Based on a determination that the file is to be encrypted, encryption key management 250 generates a public key and a private key. Referring to FIG. 3B, encryption key management 250 transmits the file and parameters (e.g., the public key, and the location where the encrypted data is to be stored (e.g., path, folder, etc.)) via IPsec VPN function 255 to encryption engine 230. According to this example, IPsec VPN function 255 uses a tunnel mode to encrypt and authenticate IP packets containing the file and the parameters, which are also encapsulated into new IP packets with new IP headers, so that the file and the parameters are transmitted in a secure manner.

Referring to FIG. 3C, encryption engine 230 receives the file and encrypts the data based on the public key. Subsequent to performing the encryption, encryption engine 230 transmits the encrypted data to mass storage device 240. The encrypted data may include the location (e.g., drive, folder, etc.) where the encrypted file is to be stored on mass storage device 240. Upon receiving the encrypted data, mass storage device 240 stores the encrypted file. According to this example, upon successfully storing the encrypted file, mass storage device 240 generates and transmits a message to both portal 220 and computer 205. Portal 220 stores the message as a part of data encryption usage history relating to user 115.

Although FIGS. 3A-3C illustrate exemplary processes associated with the data encryption service, according to other scenarios, other types of processes may be performed.

FIG. 4 is a diagram illustrating exemplary components of a device 400 that may correspond to one or more of the devices in the environments described herein. For example, device 400 may correspond to network interface device 110, network device 120, network device 130, as well as other devices illustrated and described. As illustrated in FIG. 4, according to an exemplary embodiment, device 400 includes a processor 405, memory/storage 410 that stores software 415, a communication interface 420, an input 425, and an output 430. According to other embodiments, device 400 may include fewer components, additional components, different components, and/or a different arrangement of components than those illustrated in FIG. 4 and described herein.

Processor 405 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 405 may be implemented as hardware (e.g., a microprocessor, etc.), a combination of hardware and software (e.g., a SoC, an ASIC, etc.), may include one or multiple memories (e.g., cache, etc.), etc.

Processor 405 may control the overall operation or a portion of operation(s) performed by device 400. Processor 405 may perform one or multiple operations based on an operating system and/or various applications or computer programs (e.g., software 415). Processor 405 may access instructions from memory/storage 410, from other components of device 400, and/or from a source external to device 400 (e.g., a network, another device, etc.).

Memory/storage 410 includes one or multiple memories and/or one or multiple other types of storage mediums. For example, memory/storage 410 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 410 may include a hard disk (e.g., a magnetic disk, an optical disk, a magneto-optic disk, a solid state disk, etc.) and a corresponding drive. Memory/storage 410 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 410 may include drives for reading from and writing to the storage medium.

Memory/storage 410 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 410 may store data, software, and/or instructions related to the operation of device 400.

Software 415 includes an application or a program that provides a function and/or a process. As an example, with reference to network interface device 110, software 415 may include an application that, when executed by processor 405, provides the functions of the encryption key management 250, policy engine 253, and IPsec VPN function 255, as described herein. Additionally, for example, with reference to network device 120, software 415 may include an application that, when executed by processor 405, provides the portal service, as described herein. Additionally, with reference to network device 130, software 415 may include an application that, when executed by processor 405, provides the encryption service, as described herein. Software 415 may include firmware.

Communication interface 420 permits device 400 to communicate with other devices, networks, systems, and/or the like. Communication interface 420 includes one or multiple wireless interfaces and/or wired interfaces. For example, communication interface 420 may include one or multiple transmitters and receivers or transceivers. Communication interface 420 may operate according to a protocol stack and a communication standard.

Input 425 permits an input into device 400. For example, input 425 may include a keyboard, a mouse, a display, a touchscreen, a touchless screen, a button, a switch, an input port, speech recognition logic, and/or some other type of visual, auditory, tactile, etc., input component. Output 430 permits an output from device 400. For example, output 430 may include a speaker, a display, a touchscreen, a touchless screen, a light, an output port, and/or some other type of visual, auditory, tactile, etc., output component.

Device 400 may perform a process and/or a function, as described herein, in response to processor 405 executing software 415 stored by memory/storage 410. By way of example, instructions may be read into memory/storage 410 from another memory/storage 410 (not shown) or read from another device (not shown) via communication interface 420. The instructions stored by memory/storage 410 causes processor 405 to perform a process described herein. Alternatively, for example, according to other implementations, device 400 performs a process described herein based on the execution of hardware (processor 405, etc.).

Figure 5A:
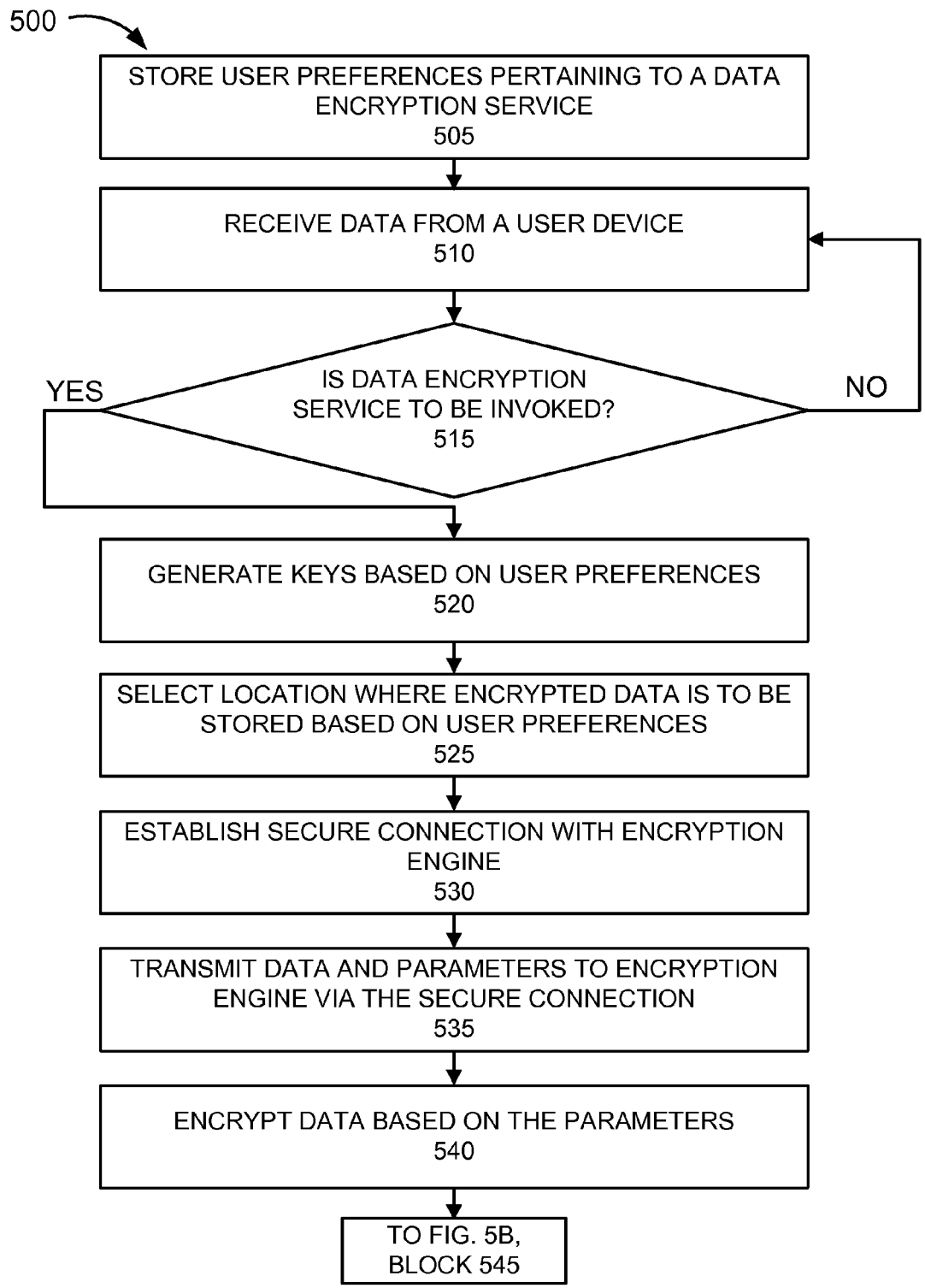
FIGS. 5A and 5B are flow diagrams that illustrate an exemplary process pertaining to the data encryption service.
Figure 5B:
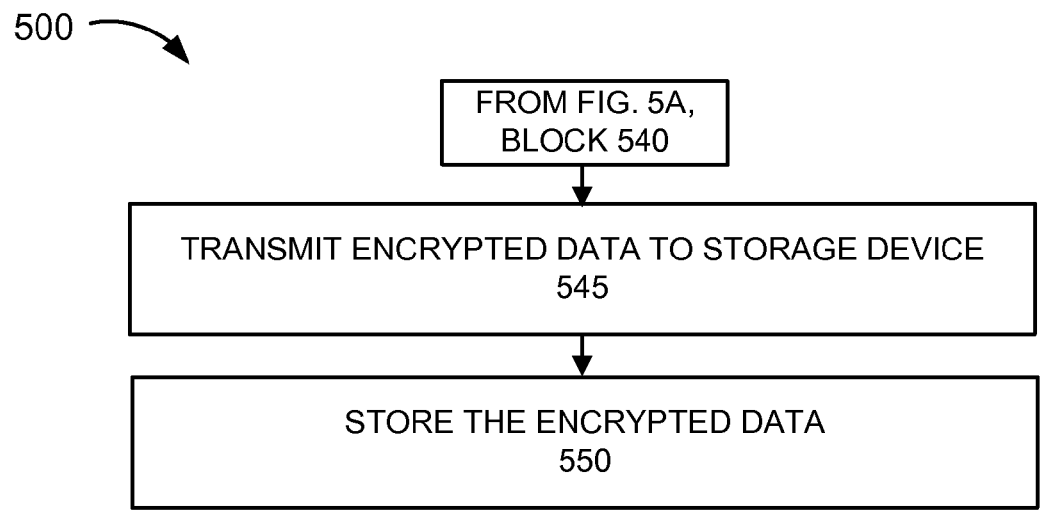

FIGS. 5A and 5B are flow diagrams illustrating an exemplary process 500 pertaining to the data encryption service. Process 500 is directed to a process previously described above with respect to FIGS. 3A-3C and elsewhere in this description. As previously described, the data encryption service provides encryption for data in-flight and at rest. Additionally, the user of the data encryption service manages keys used for encryption and decryption of the data, as well as the facets of the data encryption service. According to an exemplary embodiment, network interface device 110 performs one or more of the steps described in process 500. For example, processor 405 executes software 415 to perform the steps described.

Referring to FIG. 5A, block 505, process 500 begins when user preferences pertaining to the data encryption service are stored. For example, network interface device 110 stores user preferences (e.g., policies) that include which data are subject to the data encryption service, a type of encryption, a key length, a location where encrypted data is to be stored, and parameters pertaining to the notification service (e.g., type of communication, to whom to transmit, etc.). According to an exemplary implementation, a user configures user preferences on network interface device 110 via network device 120 (e.g., portal 220).

In block 510, data from a user device is received. For example, user device 105 transmits data to a particular destination via network interface device 110. The data may include metadata and/or may have been pre-processed (e.g., compressed, etc.).

In block 515, it is determined whether the data encryption service is to be invoked. For example, network interface device 110 uses the user preferences to determine whether the data encryption service is to be invoked for the data received. As an example, network interface device 110 may identify the destination address for the data. Additionally, or alternatively, network interface device 110 may perform deep packet inspection to identify the application associated with the data and/or other data attributes. Additionally, or alternatively, network interface device 110 may timestamp the data when the data is received and determine whether there are time-based user preferences to indicate that the data encryption service is to be invoked. Additionally, or alternatively, network interface device 110 may use information from another application. For example, the user may share his or her calendar information with network interface device 110. Depending on the application providing the calendar information, the format of the calendar information, etc., network interface device 110 may process (e.g., convert, etc.) the calendar information to allow network interface device 110 to interpret the calendar information. By way of further example, network interface device 110 may use the calendar information to associate a transmission of data (e.g., based on time proximity) with a particular event (e.g., a meeting) included in the calendar information. The user may specify that data associated with certain events (e.g., based on name of event, names of participants, location of event, etc.) are to be encrypted. Also, as previously described, the mode of user device 105 may form a basis as to whether the data is to be encrypted.

When it is determined that the data encryption service is not to be invoked (block 515-NO), process 500 returns to block 510 for receipt of additional data from the user device. In some embodiments, the return to block 510 further includes network interface device 110 transmitting the data towards the particular destination without invoking the data encryption service. Network interface device 110 waits to receive the next data transmission from user device 105.

When it is determined that the data encryption is to be invoked (block 515-YES), then keys are generated based on the user preferences. For example, network interface device 110 generates a private key and a public key according to an encryption technology specified in the user preferences. By way of further example, encryption key management 250 may include an RSA key generator that generates private and public keys for RSA encryption. Alternatively, encryption key management 250 may use PKI technology to generate public and private key pairs.

In block 525, a location where the encrypted data is to be stored is selected based on the user preferences. For example, network interface device 110 identifies where the encrypted data is to be stored based on the user preferences. In some cases, the location (e.g., destination) may be different from the destination indicated by the received data (e.g., a destination address included in packets that carry the data).

In block 530, a secure connection with the encryption engine is established. For example, network interface device 110 establishes a secure connection with network device 130 (e.g., encryption engine 230). For example, network interface device 110 may use IPSec to provide various security services, such as data origin authentication, confidentiality (e.g., encryption), data integrity, and access control. According to other implementations, network interface device 110 may establish the secure connection using other industry standard technologies, such as OpenVPN, Secure Sockets Layer (SSL), etc.

In block 535, data and parameters are transmitted to the encryption engine via the secure connection. For example, network interface device 110 transmits the data and the parameters (e.g., the public key, the network address of storage device 140, drive, folder information, etc.) to network device 130 via network 125.

In block 540, data is encrypted based on the parameters. For example, network device 130 receives the data and the parameters from network interface device 110. Network device 130 encrypts the data using the public key.

Referring to FIG. 5B, in block 545, encrypted data is transmitted to a storage device. For example, network device 130 generates and transmits the encrypted data to storage device 140. The encrypted data may include parameters pertaining to where the encrypted data is stored.

In block 550, the encrypted data is stored. For example, storage device 140 receives the encrypted data from network device 130 and stores the encrypted data.

Although FIGS. 5A and 5B illustrate an exemplary data encryption service process 500, according to other embodiments, process 500 may include additional operations, fewer operations, and/or different operations than those illustrated in FIGS. 5A and 5B, and described herein. For example, authentication and/or authorization processes may be performed between devices. As an example, the data encryption service provider may provide a digital certificate to a user when the user subscribes to the data encryption service. For example, during instantiation of the secure transport function, a digital certificate is provided to the user. The digital certificate may be used as a basis to perform authentication, etc. Also, according to other embodiments, process 500 may be performed using a keyless encryption technology or a single-key encryption technology. Additionally, or alternatively, storage device 140 may provide the notification service, as previously described.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks has been described with regard to the process illustrated in FIGS. 5A and 5B, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software and/or firmware executed by hardware. For example, a process or a function may be implemented as "logic" or as a "component." The logic or the component may include, for example, hardware (e.g., processor 405, etc.), or a combination of hardware and software (e.g., software 415). The embodiments have been described without reference to the specific software code since the software code can be designed to implement the embodiments based on the description herein and commercially available software design environments/languages.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 405) of a computational device. A non-transitory storage medium includes one or more of the storage mediums described in relation to memory/storage 410.

No element, act, or instruction described in the present application should be construed as critical or essential to the embodiments described herein unless explicitly described as such.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A method comprising:
    storing, by a first network device, user preferences pertaining to a data encryption service that provides encryption for data in-flight and at rest, wherein the user preferences indicate a location where encrypted data is to be stored and a type of data to be encrypted, and wherein the user preferences are set by a user that subscribes to the data encryption service;
    receiving, by the first network device, a first data from the user via a user device;
    determining, by the first network device, whether to invoke the data encryption service based on receiving the first data and use of the user preferences;
    generating, by the first network device, a key to encrypt the first data based on determining that the data encryption service is to be invoked;
    generating, by the first network device, a first message that includes the first data, the key, and data indicating the location;
    establishing, by the first network device, a secure connection with a second network device in response to the generating of the first message;
    transmitting, by the first network device, the first message to the second network device via the secure connection in response to the establishing;
    transmitting, by the first network device, the first data to a destination included in the first data without invoking the data encryption service based on determining that the data encryption service is not to be invoked;
    generating, by the second network device, a second message that includes encrypted first data in response to receipt of the first message; and
    transmitting, by the second network device, the second message to a third network device.

2. The method of claim 1, wherein the generating the key further comprises:
    generating, by the first network device, a key pair based on the user preferences, wherein the key pair includes a public key and a private key, and wherein the key corresponds to the public key; and
    storing, by the first network device, the private key.

3. The method of claim 1, further comprising:
    receiving, by the second network device, the first message; and
    encrypting, by the second network device, the first data based on the key.

4. The method of claim 3,
    wherein the user preferences indicate a type of encryption.

5. The method of claim 1, further comprising:
    receiving, by the third network device, the second message;
    storing, by the third network device, the encrypted first data based on receiving the second message; and
    notifying, by the third network device, the user of the user device that the encrypted first data is stored at the location.

6. The method of claim 1, wherein the user preferences include calendar information of the user, and the determining further comprises:
    determining, by the first network device, whether to invoke the data encryption service based on a use of the calendar information; and
    transmitting, by the first network device, the first data to another device based on determining that the data encryption service is not to be invoked.

7. The method of claim 1, wherein the user preferences indicate a time period during which the data encryption service is to be invoked and a time period during which the data encryption service is not to be invoked.

8. A system comprising:
    a first network device comprising:
    a first communication interface;
    a first memory, wherein the first memory stores first instructions; and
    a first processor, wherein the first processor executes the first instructions to:
        store user preferences pertaining to a data encryption service that provides encryption for data in-flight and at rest, wherein the user preferences indicate a location where encrypted data is to be stored and a type of data to be encrypted, and wherein the user preferences are set by a user that subscribes to the data encryption service;

receive, via the first communication interface, first data from the user via a user device;
determine whether to invoke the data encryption service based on the receipt of the first data and use of the user preferences;
generate a key to encrypt the first data based on a determination that the data encryption service is to be invoked;
generate a first message that includes the first data, the key, and data indicating the location;
establish, via the first communication interface, a secure connection with a second network device in response to the generation of the first message;
transmit, via the first communication interface and the secure connection, the first message to the second network device in response to the establishment of the secure connection;
transmit, via the first communication interface, the first data to a destination included in the first data without invoking the data encryption service based on a determination that the data encryption service is not to be invoked, and the system further comprising the second network device, wherein the second network device comprises:
a second communication interface;
a second memory, wherein the second memory stores second instructions; and
a second processor, wherein the second processor executes the second instructions to:
generate a second message that includes encrypted first data and the data indicating the location, in response to the receipt of the first message; and
transmit, via the second communication interface, the second message to a third network device.

9. The system of claim 8, wherein, when generating the key, the first processor further executes the first instructions to:
generate a key pair based on the user preferences, wherein the key pair includes a public key and a private key, and wherein the key corresponds to the public key; and
store the private key.

10. The system of claim 8,
wherein the second processor further executes the second instructions to:
receive, via the second communication interface, the first message; and
encrypt the first data based on the key.

11. The system of claim 10,
wherein the user preferences indicate a type of encryption.

12. The system of claim 9, further comprising the third network device, wherein the third network device comprises:
a third communication interface;
a third memory, wherein the third memory stores third instructions; and
a third processor, wherein the third processor executes the third instructions to:
receive, via the third communication interface, the second message;
store the encrypted first data based on the receipt of the second message;
generate a third message, wherein the third message indicates that the encrypted first data is stored at the location; and
transmit, via the third communication interface, the third message to the user device.

13. The system of claim 8, wherein the user preferences include calendar information of the user, and wherein when determining, the first processor further executes the first instructions to:
determine whether to invoke the data encryption service based on a use of the calendar information; and
transmit, via the first communication interface, the first data to another device based on a determination that the data encryption service is not to be invoked.

14. The system of claim 8, wherein the user preferences indicate a time period during which the data encryption service is to be invoked and a time period during which the data encryption service is not to be invoked.

15. The system of claim 8, wherein the first network device comprises one of a router, a base station, a wireless access point, a gateway device, or a computer server, and the first network device is customer premises equipment, and wherein the type of data to be encrypted indicates one or more file extensions.

16. A non-transitory, computer-readable storage medium storing instructions executable by a processor of a computational device, which when executed cause the computational device to:
store user preferences pertaining to a data encryption service that provides encryption for data in-flight and at rest, wherein the user preferences indicate a location where encrypted data is to be stored and a type of data to be encrypted, and wherein the user preferences are set by a user that subscribes to the data encryption service;
receive first data from the user via a user device;
determine whether to invoke the data encryption service based on the receipt of the first data and use of the user preferences;
generate a key to encrypt the first data based on a determination that the data encryption service is to be invoked;
generate a first message that includes the first data, the key, and data indicating the location;
establish a secure connection with another device in response to the generation of the first message;
transmit the first message to the other device via the secure connection in response to the establishment of the secure connection;
transmit the first data to a destination included in the first data without invoking the data encryption service based on a determination that the data encryption service is not to be invoked;
generate a second message that includes encrypted first data in response to the receipt of the first message; and
transmit the second message to yet another device.

17. The non-transitory, computer-readable storage medium of claim 16, wherein the instructions to generate the key further comprise instructions executable by the processor of the computational device, which when executed cause the computational device to:
generate a key pair based on the user preferences, wherein the key pair includes a public key and a private key, and wherein the key corresponds to the public key; and
store the private key.

18. The non-transitory, computer-readable storage medium of claim 17, wherein the instructions to establish the secure connection further comprise instructions executable by the processor of the computational device, which when executed cause the computational device to:
establish an Internet Protocol Security Virtual Private Network (IPSec VPN) connection.

19. The non-transitory, computer-readable storage medium of claim 16, wherein the type of data to be encrypted indicates particular metadata associated with data.

20. The non-transitory, computer-readable storage medium of claim 16, wherein the user preferences indicate at least one mode of operation of the user device, wherein when the user device operates in the at least one mode, the data encryption service is to be invoked, and the instructions to determine further storing instructions executable by the processor of the computational device, which when executed cause the computational device to:
  detect a mode of operation of the user device;
  determine whether to invoke the data encryption service based on the detection of the mode of operation and use of the user preferences; and
  invoke the data encryption service based on the determination that the data encryption service is to be invoked.

\* \* \* \* \*